(12) United States Patent
Geiger et al.

(10) Patent No.: US 12,723,651 B2
(45) Date of Patent: Sep. 1, 2026

(54) METHOD FOR OPERATING A DRIVELINE

(71) Applicant: ZF FRIEDRICHSHAFEN AG, Friedrichshafen (DE)

(72) Inventors: Simon Geiger, Oberteuringen (DE); Matthias Duller, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/785,226

(22) Filed: Jul. 26, 2024

(65) Prior Publication Data

US 2025/0043863 A1 Feb. 6, 2025

(30) Foreign Application Priority Data

Jul. 31, 2023 (DE) .................... 10 2023 207 309.9

(51) Int. Cl.

| | |
|---|---|
| ***F16H 61/66*** | (2006.01) |
| ***F16H 59/18*** | (2006.01) |
| ***F16H 59/40*** | (2006.01) |
| ***F16H 59/48*** | (2006.01) |

(52) U.S. Cl.
CPC ............ *F16H 61/66* (2013.01); *F16H 59/18* (2013.01); *F16H 59/40* (2013.01); *F16H 59/48* (2013.01); *F16H 2061/6616* (2013.01)

(58) Field of Classification Search
CPC .......... F16H 61/66; F16H 59/18; F16H 59/40; F16H 59/48; F16H 2061/6616
See application file for complete search history.

(56) References Cited

U.S. PATENT DOCUMENTS

| | | | | |
|---|---|---|---|---|
| 2017/0297559 | A1 | 10/2017 | Minamikawa et al. | |
| 2019/0249768 | A1* | 8/2019 | Kishi | F16H 61/02 |
| 2021/0062914 | A1* | 3/2021 | Endo | F16H 61/662 |
| 2021/0324954 | A1* | 10/2021 | Lim | F16H 61/08 |

FOREIGN PATENT DOCUMENTS

| | | | | |
|---|---|---|---|---|
| DE | 102020213937 | A1 | 5/2022 | |
| JP | 2010007749 | A * | 1/2010 | F16H 2061/6615 |
| JP | 2016102566 | A1 | 6/2016 | |

OTHER PUBLICATIONS

German Patent Office, Office Action issued in German patent application 10 2023 207 309.9 (Mar. 26, 2024).

* cited by examiner

*Primary Examiner* — Tisha D Lewis
(74) *Attorney, Agent, or Firm* — Secant IP, PLLC

(57) ABSTRACT

A method for operating a drivetrain of a working machine with a continuously variable transmission. The method includes a step of detecting a current drive output rotation speed (10). The drivetrain is controlled (14) in such manner as to simulate a drivetrain with a fixed-gear transmission and a bridged converter transmission when the drive output rotation speed detected is higher than or equal to a drive output rotation speed limit. The drivetrain is controlled (16) in such manner as to simulate a drivetrain with a fixed-gear transmission and a coupled converter transmission when the drive output rotation speed detected is lower than the drive output rotation speed limit. In addition, a control unit for a drivetrain of a working machine with a continuously variable transmission, and a drivetrain for a working machine.

13 Claims, 4 Drawing Sheets

METHOD FOR OPERATING A DRIVELINE

RELATED APPLICATIONS

This application claims the benefit of and right of priority under 35 U.S.C. § 119 to German Patent Application no. 10 2023 207 309.9, filed on 31 Jul. 2023, the contents of which are incorporated herein by reference in its entirety.

TECHNICAL FIELD

The present invention relates to a method for operating a drivetrain of a working machine. In addition, the invention relates to a control unit for a drivetrain, and to a drivetrain of a working machine.

BACKGROUND

In working machines, for example those designed as baggers, graders or agricultural machines, the drivetrain serves to provide propulsion. In a drivetrain with a fixed-gear transmission, which can provide various gears with a fixed gear ratio, a converter transmission is often used. The converter transmission can serve as a starting element. Furthermore, at high loads the converter transmission prevents a drive motor of the drivetrain from being excessively loaded and stalling.

Besides, there are also working machines whose drivetrain comprises a continuously variable transmission. In that way, for example, a drive motor of such a working machine can be operated with an almost constant rotation speed. Thus, the working machine can be operated very efficiently. Moreover, with such a drivetrain there is no need for a starting element such as a converter transmission. If the load is too high, then, for example, a gear ratio of the transmission is reduced in order to increase a torque at the drive output and to prevent overloading of the motor. However, it can be difficult for a driver to recognize when the drivetrain can no longer overcome the load applied.

Usually, drivers of working machines use the same working machine for long periods, or even exclusively. Correspondingly, the drivers get accustomed to the special features of the drivetrain of the working machines. During this, for example, a behavior of the working machine is learned and used for the desired control of the working machine. If then a driver changes to a working machine with different characteristics, this can result in operating errors. In general, drivers feel uncomfortable when they use working machines whose behavior does not match their expectations.

SUMMARY

A first aspect of the invention relates to a method for operating a drivetrain of a working machine. The working machine can for example be in the form of an agricultural machine or a building machine. Examples of working machines are tractors, graders, and wheel loaders. A drivetrain can be designed to provide a propulsion force with the working machine for a driver. The drivetrain can comprise, for example, a drive motor such as an internal combustion engine or an electric motor. The drivetrain can also comprise more than one drive motor.

The drivetrain comprises a transmission, by means of which, for example, a driving force can be transmitted from the drive motor to a drive output of the working machine. The transmission is in the form of a continuously variable transmission. For that purpose, the transmission can be designed with power branching. For example, the transmission can be in the form of a hydraulic power-branched transmission with a hydrostat. The drive output of the working machine can also be a drive output of the drivetrain. A drive output can, for example, be in the form of a shaft which is connected to a differential of the working machine. A drive output can also be in the form of a driven axle, wheels, or a driving chain. The drive motor can, for example, always deliver a driving force when the drivetrain is activated. This can, for example, be the case when the drive motor is in the form of an internal combustion engine. However, the drivetrain can also be designed not to produce driving force with the drive motor in particular conditions. That can, for example, be the case when the drive motor is in the form of an electric motor and no propulsion is called for, and no secondary consumer has to be powered by the drive motor.

The force transmission and alternatively or in addition the driving force production can for example be controlled by means of an accelerator pedal. The accelerator pedal can also be in the form of a lever or some other operating element. For example, the accelerator pedal can be in the form of a virtual accelerator pedal which is actuated by hand on a touchscreen. The drivetrain can also comprise a reversing gearbox by means of which, for example, a rotation direction at the drive output can be reversed relative to the drive input. The drivetrain can for example be devoid of a hydrodynamic converter or a starting clutch.

The method comprises a step of detecting a current drive output rotation speed. The drive output rotation speed can be determined, for example, directly by means of a rotation speed sensor. However, the drive output rotation speed can also be determined by calculating indirectly with reference to other condition parameters, such as a motor rotation speed and a current gear ratio. The drive output rotation speed can correspond to a rotation speed of the drive output of the drivetrain. The drive output rotation speed can correspond to a travelling speed of the working machine.

The method comprises a step of controlling the drivetrain. If the drive output rotation speed determined is higher than or equal to a drive output rotation speed limit, then the drivetrain is controlled so as to simulate a drivetrain with a fixed-gear transmission and a bridged converter transmission. If the drive output rotation speed determined is lower than the drive output rotation speed limit, then the drivetrain is controlled so as to simulate a drivetrain with a fixed-gear transmission and a coupled converter transmission. In addition, the drive motor can be controlled so as to simulate an internal combustion engine. For example, even with the accelerator pedal not actuated and no demand for propulsion, the drive motor can be operated with a minimum rotation speed.

The drive output rotation speed limit can be a threshold value for a detected current drive output rotation speed. The drive output rotation speed limit can for example be a fixed specified value. The drive output rotation speed limit can also be determined, for example, as a function of further influencing factors such as an attached load. In the simulation, the drivetrain with the continuously variable transmission can be controlled in such manner that its behavior corresponds essentially to that of an actual drivetrain with a fixed-gear transmission and a converter transmission that can be bridged. A converter transmission that can be bridged can, for example, participate in the driving force transmission by means of a converter bridging clutch. A bridged converter transmission, for example, plays no part in the transmission of driving force from the drive motor to the drive output. For that to happen, the converter bridging clutch can be closed. In contrast, for example, a coupled converter transmission can participate in the transmission of driving force from the drive motor to the drive output and can thereby provide a further transmission ratio. The transmission ratio of the coupled converter transmission can be dependent on the load and alternatively or in addition dependent on the rotation speed. In that way the converter transmission can help as necessary when starting off and against an undesired motor load. In other driving conditions, in contrast, high efficiency can be achieved by decoupling. The converter transmission can for example be in the form of a hydrodynamic torque converter. The converter transmission can be in the form of a starting element.

The corresponding drive input behavior can thus be simulated by the method with a continuously variable transmission. With increasing load, the converter transmission can change a gear ratio so that as the drive output rotation speed decreases as motor torque increases. Thus, the converter transmission can avoid stalling of a drive motor in the form of an internal combustion engine at high loads and low driving speeds. In the simulation, a drivetrain with an internal combustion engine as its drive motor can be simulated. In such a case the drivetrain can actually comprise an internal combustion engine. A fixed-gear transmission, for example, can provide one or more transmission ratios, such as gears, for torque transmission. The drivetrain can be controlled in such manner that the driver can select a gear by means of a drive operation element, which is based on the control for simulating the fixed-gear transmission. For example, the driver can choose between a first gear and a second gear in the simulation. In that way different fixed gear ratios between the drive motor and the drive output can be obtained. These transmission ratios can then correspondingly be provided in the simulation by the continuously variable transmission, for example, so long as the current drive output rotation speed is higher than or equal to the drive output rotation speed limit. In the simulation, however, a single virtual gear can be firmly specified. Thus, a drivetrain with a fixed-gear transmission with only one gear can be simulated.

The method enables various operating behaviors to be provided by a drivetrain and, for example, a behavior to be simulated which is not originally caused by the design of the drivetrain. Thus, for different drivers respectively a different and familiar behavior of the drivetrain can be achieved. For example, each driver can select a desired behavior in accordance with his preferences or with a current operating situation. At the same time, the advantages of a drivetrain with a continuously variable transmission can be used. For example, a rear-side ripper or a coarse grading can be operated more efficiently and with greater functional flexibility with a continuously variable transmission. In contrast, in the simulation of a drivetrain with a fixed-gear transmission and a converter transmission, for example, fine grading can be facilitated. The driver can recognize when the load is large by virtue of a pressure and hence an increase of a motor rotation speed while the drive output rotation speed is decreasing. Thus, a direct and for example acoustic feedback concerning the load applied during grading is possible. During the fine grading the driver controls the load, for example by adjusting the plate and thereby also controlling a material flow, instead of by actuating an accelerator pedal. In that way uneven grading and slipping of the drive wheels can be reliably avoided.

The method can comprise a step of selecting an operating mode for the drivetrain. For this, the drivetrain can be designed to be operated in various operating modes. An operating mode can for example specify a control mode of the drivetrain. For example, the drivetrain can be designed to be operated in a normal mode and a simulation mode. In the normal mode the drivetrain can be controlled as usual with a continuously variable transmission. For example, a motor rotation speed is then kept essentially constant, and the driving speed is controlled by continuously adapting the transmission ratio. In contrast, in the simulation mode the behavior of a drivetrain with a fixed-gear transmission and a converter transmission that can be bridged can be simulated. For example, both in the normal mode and in the simulation mode a boost mode can also be used. By means of the boost mode, for example for a short time a power level higher compared with long-term operation can be provided. The selection can determine the activation of one of the two operating modes. The selection can be made by a driver of the working machine, for example, by means of a switch or some other operating element. For example, the normal mode can be activated as the default mode until the driver activates the simulation mode. By deactivating the simulation mode, the normal mode can be selected again automatically. The operating mode can also be selected automatically, for example as a function of a driver profile, a location of the working machine, an ID used for activating the working machine, or an activation code or a key used for the purpose. The operating mode can also be factory-specified. For example, the working machine can be delivered to a customer with one of the two operating modes as the selected operating mode and can no longer then be changed by the driver. For example, the operating mode can in such a case only be changed during a maintenance operation.

In a further embodiment of the method, it can be provided that a fixed transmission ratio is obtained with the continuously variable transmission when the drivetrain is controlled so as to simulate the bridged converter transmission. The fixed transmission ratio can be selected, for example by the driver in discrete steps. In that case the fixed transmission ratio can be changed by the driver even during the simulation, in order to simulate a gearshift. Thus, provided that the current drive output rotation speed is higher than or equal to the drive output rotation speed limit, a drive output rotation speed can be proportional to the motor rotation speed. Accordingly, the driver can simply control the driving speed directly by means of the accelerator pedal. Optionally, the driving speed can be controlled by way of a currently selected virtual gear. In a variant, the simulation is only used in certain gears, such as the lowest gear.

In a further embodiment of the method, it can be provided that a variable transmission ratio is obtained with the continuously variable transmission when the drivetrain is controlled so as to simulate the coupled converter transmission. For example, the transmission ratio in the continuously variable transmission can be adjusted as a function of the current drive output rotation speed detected, provided that the current drive output rotation speed is lower than the drive output rotation speed limit. In that way a partial decoupling of the drive output from the drive motor by a converter transmission can be simulated. For example, as the drive output rotation speed decreases a transmission ratio of the continuously variable transmission is also reduced. For example, when the accelerator pedal is fully actuated and the drive output rotation speed is falling, the motor rotation speed increases up to a maximum idling rotation speed when the working machine is at rest owing to a load that is too great, which impedes a movement of the working machine. In contrast, when the accelerator pedal is not actuated the motor rotation speed can correspond to an essentially constant rotation speed or a minimum motor rotation speed provided that the current drive output rotation speed is lower than the drive output rotation speed limit. By actuating the accelerator pedal the performance can be scaled between these extremes. For example, if the accelerator pedal is actuated half-way, the rotation speed of the drive motor at rest can lie between the minimum motor rotation speed and the maximum motor rotation speed.

In a further embodiment of the method, it can be provided that during the simulation of the bridged converter transmission and alternatively or in addition during the simulation of the coupled converter transmission, the drivetrain can be controlled as a function of a target drive output rotation speed. The target drive output rotation speed can for example be determined separately for the simulation of the coupled converter transmission and the bridged converted transmission. For the actual control, whichever of these two-target drive output rotation speeds is the higher is then used. In that way the drive output rotation speed limit can also be determined. The drive output rotation speed limit then corresponds for example to the rotation speed at which the two-target drive output rotation speeds are equal. Thus, the drivetrain can be rotation-speed-controlled. The target drive output rotation speed can depend on the accelerator pedal. For example, the respective target drive output rotation speeds can be determined as a function of an accelerator pedal position detected. The method can further comprise a step of detecting an accelerator pedal position. The accelerator pedal position can correspond to an actuation of the accelerator pedal. The accelerator pedal can for example be designed as a gas pedal. Optionally, the respective target rotation speeds can also be determined as a function of a selected transmission ratio for the simulated fixed-gear transmission. As a function of the target drive output rotation speed used for control purposes a target motor rotation speed can be determined, for example as a function of a current transmission ratio of the continuously variable transmission.

In a further embodiment of the method, it can be provided that the drive output rotation speed limit is specified as a function of a detected accelerator pedal position. In that way, when the converter transmission is bridged or coupled a simulation can take place as a function of a power called for by the drive motor. For example, when the accelerator pedal is actuated more vigorously, i.e., when it is in a more extreme position, a higher drive output rotation speed limit is set. When the drive motor calls for more power, with the drivetrain to be simulated for example a motor suppression at higher rotation speeds can take place, during which the converter transmission would then be automatically coupled. Alternatively, the drive output rotation speed limit can be specified independently of the accelerator pedal position, for example as a fixed threshold value.

In a further embodiment of the method, it can be provided that the drive output rotation speed limit is specified as a function of the drive output rotation speed. For example, a characteristic line for the drive output rotation speed limit can be displaced. In that way an accelerator-pedal-dependent and load-dependent drive output rotation speed limit can be specified in a simple manner. Thus, in a simple manner a change in the simulation from the coupled converter transmission to the bridged converter transmission can be parameterized.

A second aspect relates to a control unit for a drivetrain of a working machine. The control unit can for example be designed to carry out the method according to the first aspect. The respective advantages and further features emerge from the description of the first aspect, so that versions of the first aspect are also versions of the second aspect, and vice-versa.

The control unit is designed to control the drivetrain so as to simulate a drivetrain with a fixed gear transmission and a bridged converter transmission when the drive output rotation speed detected is higher than or equal to a drive output rotation speed limit. The control unit is designed to control the drivetrain so as to simulate a drivetrain with a fixed gear transmission and a coupled converter transmission when the drive output rotation speed detected is lower than the drive output rotation speed limit. The control unit can comprise one or more microprocessors. The control unit can be designed to control the continuously variable transmission and alternatively or in addition to control the drive motor. The control unit can be designed to maintain and process a current drive output rotation speed detected.

A third aspect relates to a drivetrain for a working machine. The drivetrain can be designed, for example, to be operated by the method according to the first aspect. The drivetrain can comprise a control unit according to the second aspect. The respective advantages and further features emerge from the description of the first aspect and the second aspect, so that versions of the first and second aspects are also versions of the third aspect, and vice-versa.

The drivetrain comprises a drive motor, a continuously variable transmission, a detection device, and a control unit. In addition, the drivetrain can comprise a drive output. The drive motor is designed to provide a driving force, for example, for propelling the working machine. The transmission is designed to transmit a driving force produced by the drive motor to the drive output with a continuously variable transmission ratio. For that purpose, the transmission can produce a mechanical functional connection between the drive motor and the drive output. The driving force can for example be applied by the drive motor to a motor shaft. The drivetrain can be designed, optionally, to operate in a normal mode and in a simulation mode as its operating modes. For that purpose, the drivetrain can comprise a mode selection element, for example in the form of a switch.

The control unit can be designed to simulate a drivetrain with a fixed-gear transmission and a converter transmission by controlling the drivetrain, for example, when the simulation mode is activated. If the drive output rotation speed detected is higher than or equal to a drive output rotation speed limit, the control unit controls the drivetrain so as to simulate a drivetrain with a fixed-gear transmission and a bridged converter transmission. If the drive output rotation speed detected is lower than the drive output rotation speed limit, then the control unit controls the drivetrain so as to simulate a drivetrain with a fixed-gear transmission and a coupled converter transmission. The transmission can, for example, be in the form of a hydraulic power-branched transmission. The control unit can be designed such that in the normal mode it controls the drivetrain as a function of an accelerator pedal position and optionally a selected driving range. During this the control unit can determine a target drive output rotation speed and as a function thereof set a motor rotation speed and a transmission ratio. For the motor rotation speed, in this case for example an essentially constant motor rotation speed can be specified.

DETAILED DESCRIPTION OF EMBODIMENTS

Figure 4:
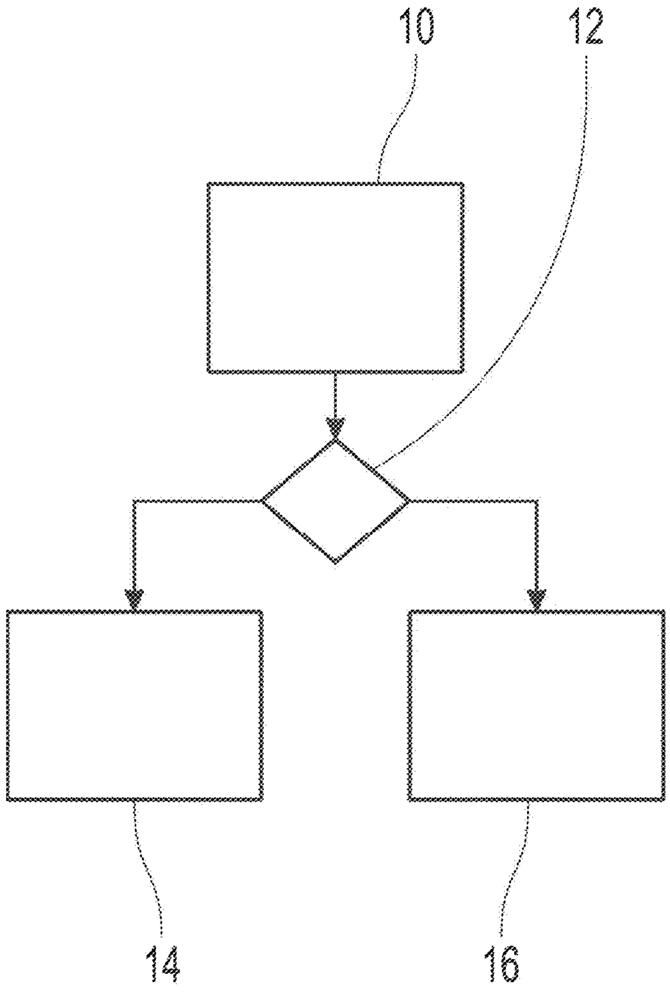
FIG. 4 illustrates schematically a method for operating a drivetrain.

FIG. 4 illustrates schematically a method for operating a drivetrain of a working machine, wherein the drivetrain comprises a continuously variable transmission. In a step 10 a current drive output rotation speed is detected. In a step 12 it is determined whether the drive output rotation speed detected is higher than or equal to a drive output rotation speed limit. If the drive output rotation speed detected is higher than or equal to the drive output rotation speed limit, the system moves on to step 14. In step 14 the drivetrain is controlled so as to simulate a drivetrain with a fixed-gear transmission and a bridged converter transmission. For this, a fixed transmission ratio is set, and a motor rotation speed is specified as a function of a detected accelerator pedal position. In an embodiment the motor rotation speed and alternatively or in addition the fixed transmission ratio is/are also specified or set as a function of a gear of a selected fixed-gear transmission that is to be simulated. Provided that the drive output rotation speed detected is lower than the drive output rotation speed limit, the system moves on to step 16. In step 16 the drivetrain is controlled so as to simulate a drivetrain with a fixed-gear transmission and a coupled converter transmission. In this range, for the motor rotation speed with the accelerator pedal not actuated, i.e., with the accelerator pedal in its starting position, the transmission ratio is reduced as the drive output rotation speed decreases and a minimum motor rotation speed is specified which simulates an idling behavior. If the accelerator pedal is actuated, then an increasing motor rotation speed and a decreasing transmission ratio are set in order to simulate the behavior of the coupled converter transmission.

Figure 1:
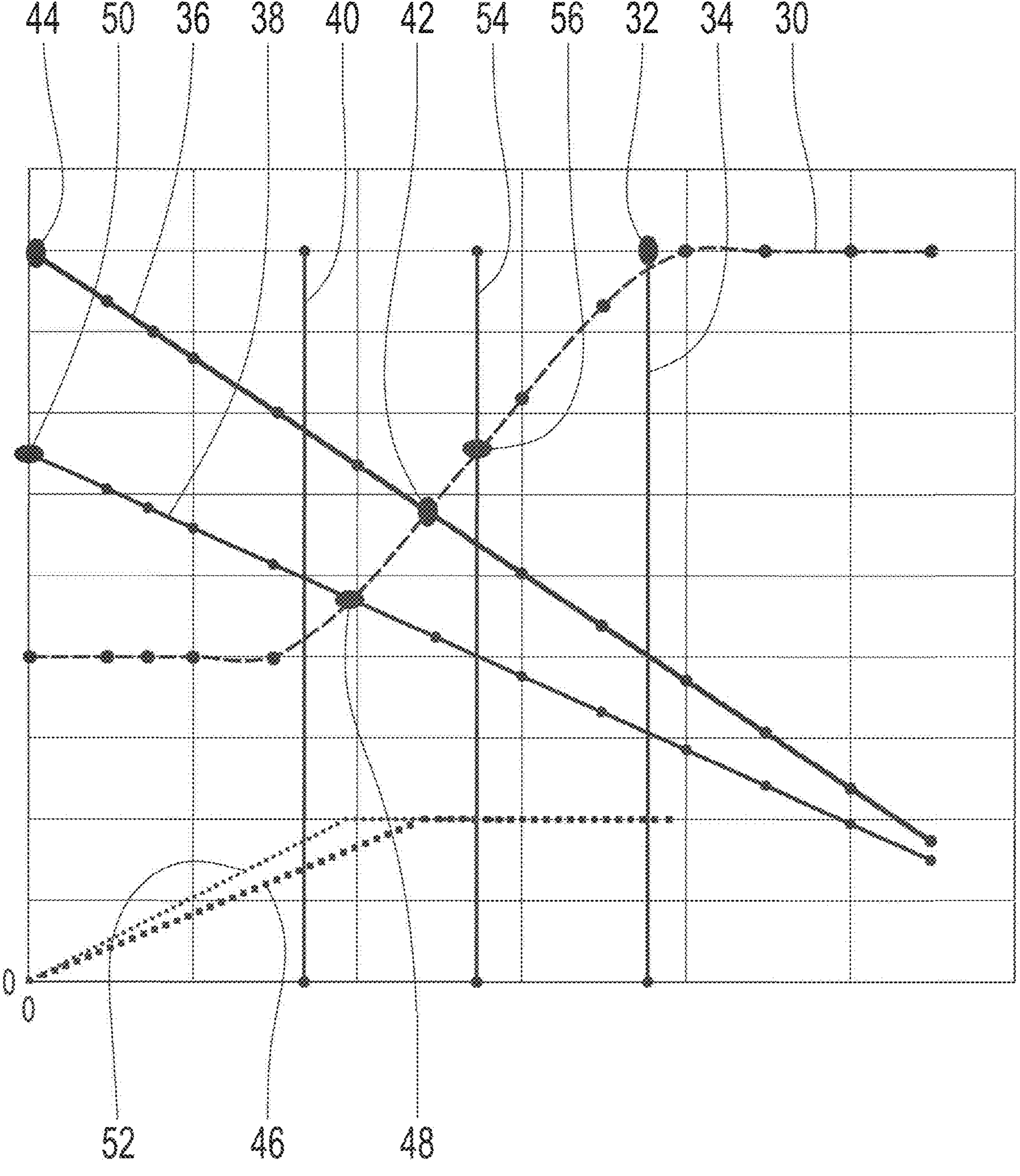
FIG. 1 illustrates schematically in a diagram a control method for simulating a converter transmission in accordance with a first embodiment, wherein motor rotation speeds and transmission ratios are plotted against drive output rotation speeds as control characteristics.

In FIG. 1, along the ordinate a motor rotation speed is shown by the upper characteristic line, and the lower characteristic line shows a reciprocal transmission ratio of the continuously variable transmission. Along the abscissa a drive output rotation speed is shown. A first characteristic line 30 shows the motor rotation speed during a simulation of the fixed-gear transmission with the converter transmission bridged. Depending on the load applied, when power is called for a corresponding drive output rotation speed is produced. A target drive output rotation speed that depends on a current accelerator pedal position N_ab_Ziel(FP) on the first characteristic line 30, here at the point 32, is calculated using the following formula:

$$\text{N\_ab\_Ziel}(FP) = ((\text{n\_mot\_high\_idle} * \text{i\_rez\_festgang}) - (\text{n\_mot\_low\_idle} * \text{i\_rez\_festgang})) * FP/100 + \text{n\_mot\_low\_idle} * \text{i\_rez\_festgang}$$

in which n_mot_high_idle is a load-free motor rotation speed when the accelerator pedal is fully actuated, i_rez_festgang is the fixed transmission ratio set, by virtue of which a transmission ratio by which a fixed-gear transmission with a particular gear is simulated by the continuously variable transmission, and n_mot_low_idle is a load-free motor rotation speed when the accelerator pedal is not actuated. FP stands for an accelerator pedal position wherein zero corresponds to a non-actuated accelerator pedal and 100 to a fully actuated accelerator pedal. A drive output rotation speed determined in that way for the point 32 is shown by the vertical line 34. From a minimum motor rotation speed represented by a vertical line 40 even during the simulation of the bridged converter transmission the transmission ratio is no longer constant but varies in order to be able to operate the drive motor with the load-free motor rotation speed when the accelerator pedal is not actuated n_mot_low_idle and to avoid stalling. However, this no longer corresponds to an operating behavior that a driver would expect from a drivetrain with a fixed-gear transmission and a converter transmission that can be bridged.

A target motor rotation speed corresponding to this as a function of the current accelerator pedal position n_Mot_Ziel(FP) can be calculated using the formula:

$$\text{n\_Mot\_Ziel}(FP) = \text{n\_ab\_Ziel}(FP) * \text{i\_rez\_festgang}$$

Correspondingly, there is a control value for the drive motor when simulating the drivetrain with a fixed-gear transmission and a bridged converter transmission. For the target motor rotation speed when simulating the drivetrain with a fixed-gear transmission and a coupled converter transmission, the corresponding converter rotation speed is calculated using the following formula:

$$\text{Converter rotation speed} = \left(\text{n\_ab\_Ziel}(FP) - \text{n\_ab\_ist/n\_ab\_Ziel}(FP) * (\text{n\_mot\_Ziel}(FP) - \text{n\_mot\_low\_idle}) + \text{n\_mot\_low\_idle}\right.$$

In this case the converter rotation speed is a function of a current drive output rotation speed n_ab_ist. The drive output rotation speed limit corresponds to that drive output rotation speed at which the converter rotation speed corresponds to the target motor rotation speed that depends on the current accelerator pedal position n_Mot_Ziel(FP) when simulating the drivetrain with a fixed-gear transmission and a bridged converter transmission. Thus, the values of these two rotation speeds are always used for controlling the drive motor. The converter rotation speed corresponds to the target motor rotation speed while simulating the coupled converter transmission.

With a fixed-gear transmission ratio in this case selected as 0.42, an idling rotation speed with the accelerator pedal fully actuated, n_mot_high_idle, of 1800 rpm and an idling rotation speed with the accelerator pedal not actuated, n_mot_low_idle, of 800 rpm, we obtain for the fully actuated accelerator pedal a characteristic line 36 and for a half-way actuated accelerator pedal a characteristic line 38. Further characteristic lines can also be calculated or extrapolated or interpolated. Thus, the change from the simulation with a bridged converter transmission and with a coupled converter transmission depends on the accelerator pedal position, so that the drive output rotation speed limit too is determined as a function of the accelerator pedal position.

For the sake of clarity, the control behavior will now be explained with reference to an example. At first the working machine is travelling with the motor rotation speed and drive output rotation speed represented by the point 32. The load at the drive output now increases over a permissible traction force, in this example owing to a higher grading resistance. The drive output rotation speed decreases correspondingly and the target motor rotation speed N_Mot_Ziel(FP) decreases linearly along with it, since the gear ratio i_rez_festgang remains constant in order to simulate the fixed-gear transmission. During this the accelerator pedal is fully actuated. At a point 42 the drive output rotation speed limit for that accelerator pedal position is then reached and the simulation of a coupled converter transmission begins. Even with an actual drivetrain with a bridged converter transmission and a fixed-gear transmission, at that point the converter transmission would be coupled, and the bridging terminated automatically. With a further reduction of the drive output rotation speed owing to the load applied, the motor rotation speed now increases in accordance with the characteristic line 36 and corresponds to the calculated converter rotation speed. For this, the reciprocal transmission ratio in the continuously variable transmission is reduced, as shown by the characteristic line 46. At point 44 the working machine is at rest and the drive motor rotates at the idling rotation speed with the fully actuated accelerator pedal, n_mot_high_idle.

The course when the accelerator pedal is only half-actuated is analogous to the above, but the drive output rotation speed limit is not reached until the point 48. Correspondingly, as the load increases and the drive output rotation speed decreases, the motor rotation speed follows the characteristic line 38 as far as the point 50. At point 50 the working machine is at rest and the drive motor rotates, in this example, at an idling rotation speed of 1300 rpm with the accelerator pedal half-actuated. With the accelerator pedal half-actuated, the course of the reciprocal transmission ratio is shown by the characteristic line 52.

If the load decreases again, a reverse sequence takes place. With a half-actuated accelerator pedal, an operating point 56 is obtained as the operating point when there is no suppression due to an applied load, for which point the corresponding drive output rotation speed is shown by a vertical line 54. With this control logic a drivetrain with a fixed-gear transmission and a converter transmission that can be bridged can be simulated by the drivetrain with a continuously variable transmission, such that the simulated drivetrain automatically couples the converter transmission.

Figure 2:
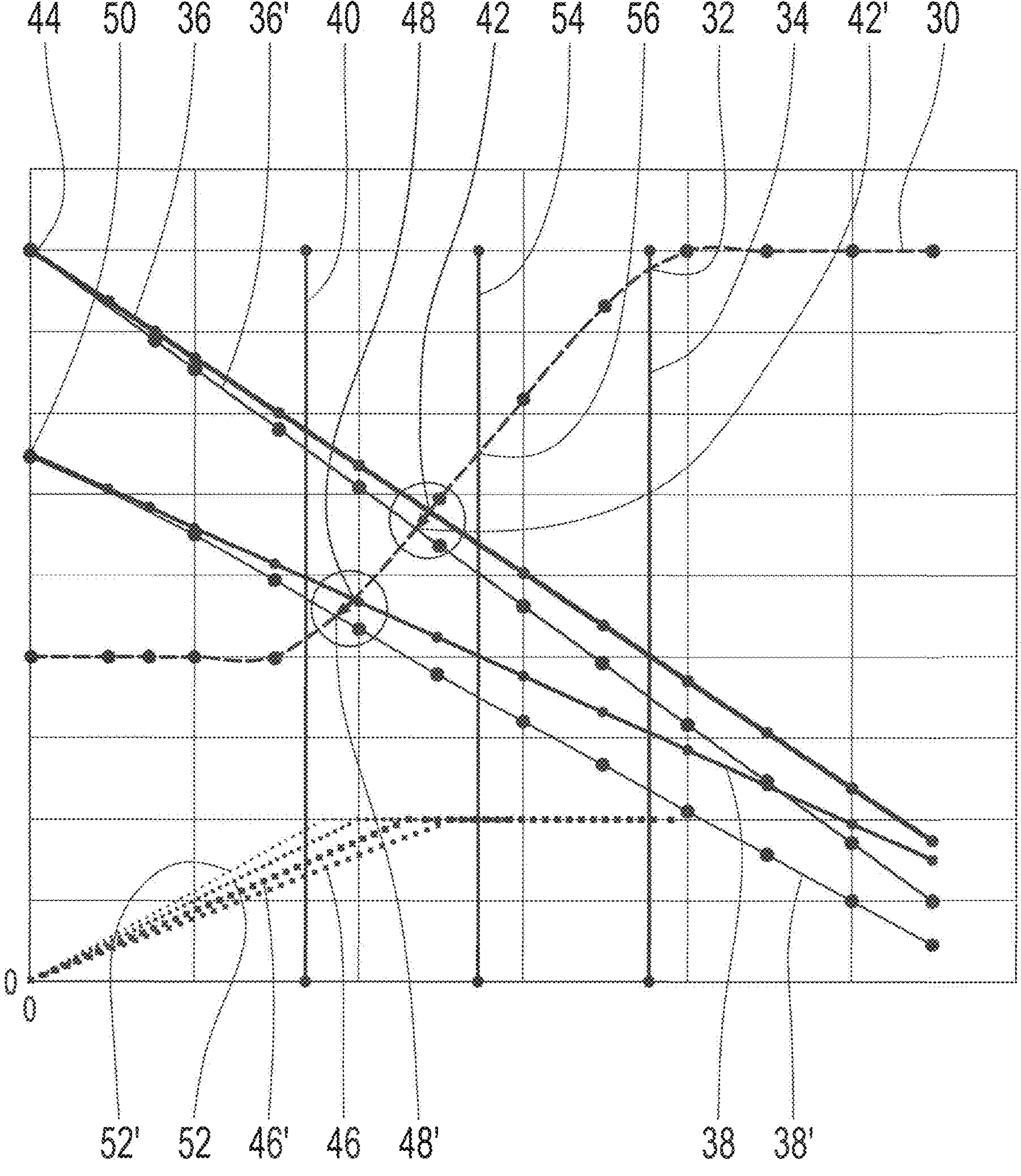
FIG. 2 illustrates schematically in a diagram a control method for simulating a converter transmission in accordance with a second embodiment, wherein motor rotation speeds and transmission ratios are plotted against drive output rotation speeds as control characteristics.

FIG. 2 illustrates the same characteristic lines with the same diagram structure as FIG. 1. In addition, however, a modification of the control parameters is shown, by virtue of which a transition point from the simulation of the fixed-gear transmission ratio with the bridged converter transmission to the coupled converter transmission is displaced. In that way the drive output rotation speed limit can be changed by way of a parameterization. The converter rotation speed in the simulation of the coupled converter transmission is now calculated using the following formula:

$$\text{Converter rotation speed} = (\text{n\_ab\_Ziel}(FP) - \text{n\_ab\_ist})/\text{n\_ab\_Ziel}(FP) * (\text{n\_mot\_Ziel}(FP) - \text{n\_mot\_Wandler\_base}) + \text{n\_mot\_Wandler\_base}$$

Instead of the load-free motor rotation speed with a non-actuated accelerator pedal n_mot_low_idle, a converter basis rotation speed n_mot_Wandler_base is now used for the calculation. The converter basis rotation speed n_mot_Wandler_base is here determined as a function of the drive output rotation speed and in the example illustrated decreases in a linear manner with the drive output rotation speed. Thereby, the accelerator-pedal-dependent characteristic lines 36, 38 for the motor control when simulating a coupled converter transmission are displaced to the characteristic lines 36', 38' as shown in FIG. 2. Correspondingly, the corresponding characteristic lines 46, 52 for the reciprocal transmission ratio in the continuously variable transmission, which are set for the simulation, are changed to the characteristic lines 46', 52'. The accelerator-pedal-dependent transition point and the drive output rotation speed limit are then displaced from the points 42, 48 to the points 42', 48'.

Figure 3:
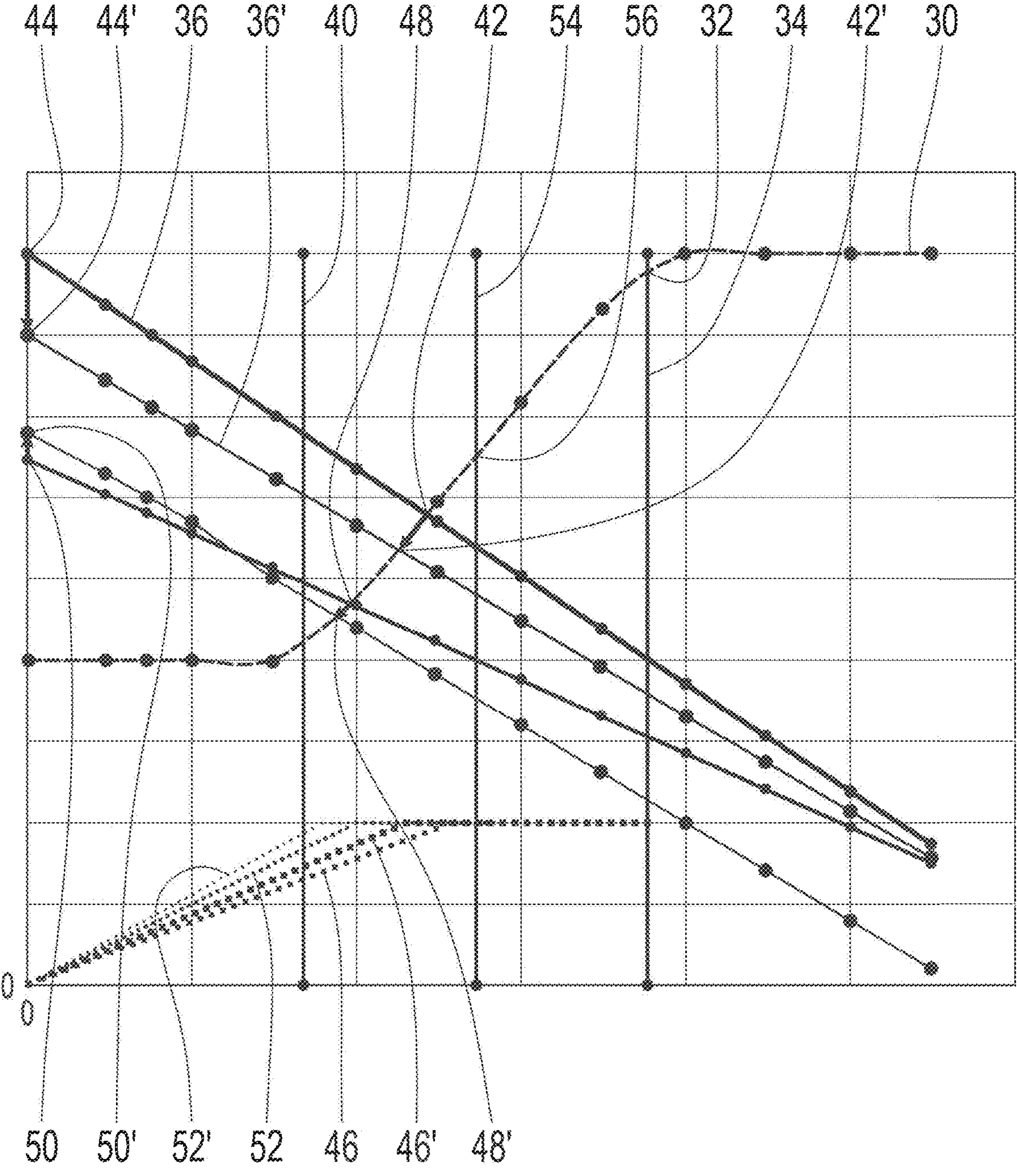
FIG. 3 illustrates schematically in a diagram a control method for simulating a converter transmission in accordance with a third embodiment, wherein motor rotation speeds and transmission ratios are plotted against drive output rotation speeds as control characteristics.

FIG. 3 illustrates the same characteristic lines with the same diagram structure as FIG. 2. In addition, however, a modification of the control parameters is shown, with which a motor rotation speed while stationary is displaced. For this, during the simulation of the coupled converter transmission the converter rotation speed is now calculated using the following formula:

$$\text{Converter rotation speed} = (\text{n\_ab\_Ziel}(FP) - \text{n\_ab\_ist})/\text{n\_ab\_Ziel}(FP) * \text{FP\_Factor} * (\text{n\_mot\_Ziel}(FP) - \text{n\_mot\_Wandler\_base}) + \text{n\_mot\_Wandler\_base}$$

An addition to this is an accelerator-pedal-dependent scaling factor in the simulation of the coupled converter transmission. In the example shown, this decreases progressively with increasing actuation of the accelerator pedal. Correspondingly, the points 44, 50 when the working machine is at rest are displaced to the points 44', 50', wherein the motor rotation speed at point 44' is now 1600 rpm and at point 50' it is now 1350. The corresponding reciprocal transmission ratio is displaced correspondingly.

INDEXES

- 10 Detection of a current drive output rotation speed
- 12 Comparison of the current drive output rotation speed with the drive output rotation speed limit
- 14 Control of a drivetrain: simulation of a fixed-gear transmission and a bridged converter transmission
- 16 Control of a drivetrain: simulation of a fixed-gear transmission and a coupled converter transmission
- 30 Characteristic line for the target drive output rotation speed
- 32 Point for calculating the target drive output rotation speed with reference to the first formula
- 34 Line for the drive output rotation speed determined at point 32
- 36. 36' Characteristic line for a fully actuated accelerator pedal
- 38, 38' Characteristic line for a half-actuated accelerator pedal
- 40 Line for the minimum motor rotation speed
- 42, 42' Point for the drive output rotation speed limit with a fully actuated accelerator pedal
- 44, 44' Point for idling rotation speed with a fully actuated accelerator pedal while at rest
- 46, 46' Characteristic line for the reciprocal transmission ratio
- 48, 48' Point for the drive output rotation speed limit with a half-actuated accelerator pedal
- 50, 50' Point for idling rotation speed with a half-actuated accelerator pedal while at rest 52, 52' Characteristic line for the reciprocal transmission ratio with a half-actuated accelerator pedal 54 Line for the drive output rotation speed that corresponds to the operating point 56 Operating point

The invention claimed is:

1. A method for operating a drivetrain of a working machine with a continuously variable transmission, wherein the method comprises at least the following steps:

controlling a traveling speed of the working machine to at least accelerate the working machine;

detecting a current drive output rotation speed;

comparing the current drive output rotation speed to a drive output rotation speed limit;

controlling the drivetrain to simulate a drivetrain with a fixed-gear transmission and a bridged converter transmission, when the current drive output rotation speed is higher than or equal to the drive output rotation speed limit;

controlling the drivetrain to simulate a drivetrain with a fixed-gear transmission and a coupled converter transmission, when the current drive output rotation speed is lower than the drive output rotation speed limit; and the drive output rotation speed limit is specified as a function of a detected accelerator pedal position such that when the accelerator pedal is actuated, an increasing motor rotational speed is set and a decreasing transmission ratio is set to simulate behavior of the coupled converter transmission.

2. The method according to claim 1, wherein controlling the drivetrain to simulate the bridged converter transmission includes the continuously variable transmission having a fixed transmission ratio.

3. The method according to claim 2, comprising:

detecting a decreasing drive output rotation speed; and reducing a transmission ratio in response to determining the decreasing drive output rotation speed, wherein controlling the drivetrain to simulate the coupled converter transmission includes the continuously variable transmission having a variable transmission ratio.

4. The method according to claim 1, wherein simulating the bridged converter transmission and the coupled converter transmission includes controlling the drivetrain as a function of a target drive output rotation speed which is based on a detected accelerator pedal position.

5. The method according to claim 1, wherein the drive output rotation speed limit is specified as a function of the drive output rotation speed.

6. A control unit for a drivetrain of a working machine with a continuously variable transmission, wherein the control unit is configured to control the drivetrain so as to simulate a drivetrain with a fixed-gear transmission and a bridged converter transmission when a drive output rotation speed detected is higher than or equal to a drive output rotation speed limit, and wherein the control unit is further configured to control the drivetrain so as to simulate a drivetrain with a fixed-gear transmission and a coupled converter transmission when the drive output rotation speed detected is lower than the drive output rotation speed limit, and wherein the drive output rotation speed limit is specified as a function of a detected accelerator pedal position such that when the accelerator pedal is actuated, an increasing motor rotational speed is set and a decreasing transmission ratio is set to simulate behavior of the coupled converter transmission.

7. A drivetrain for a working machine, wherein the drivetrain comprises:

a drive motor configured to provide a driving force;

a continuously variable transmission configured to transmit the driving force from the drive motor to a drive output with a continuously adjustable transmission ratio;

a detection device configured to detect a current drive output rotation speed of the drivetrain; and a control unit configured to control the drivetrain when the drive output rotation speed detected is higher than or equal to a drive output rotation speed limit, at which the drivetrain is controlled to simulate a drivetrain having a fixed-gear transmission and a bridged converter transmission, which fully transmits the driving force from the drive motor to the drive output via an engaged converter bridging clutch, such that the driving force in the drivetrain is transmittable via the continuously variable transmission only at different fixed gear ratios, and the control unit is configured to control the drivetrain when the drive output rotation speed detected is lower than the drive output rotation speed limit, at which the drivetrain is controlled to simulate a drivetrain having a fixed-gear transmission and a coupled converter transmission, which variably transmits the driving force from the drive motor to the drive output such that the driving force in the drivetrain is transmittable via the continuously variable transmission at different fixed gear ratios and a continuously variable transmission ratio.

8. A method for operating a drivetrain of a working machine having a drive engine which transmits a driving force via a continuously variable transmission to a drive output, wherein the method comprises at least the following steps:

controlling a traveling speed of the working machine to accelerate and decelerate the working machine detecting a current drive output rotation speed of the drive output;

comparing the current drive output rotation speed with a drive output rotation speed limit;

controlling the drivetrain when the current drive output rotation speed is lower than the drive output rotation speed limit, at which the drivetrain is controlled to simulate a drivetrain having a fixed-gear transmission and a coupled converter transmission in which the driving force is variably transmitted, via the coupled converter transmission, to the fixed-gear transmission, such that the driving force in the drivetrain is transmittable via the continuously variable transmission at different fixed gear ratios and a continuously variable transmission ratio.

9. The method according to claim 8, wherein controlling the drivetrain when the current drive output rotation speed is greater than or equal to the drive output rotation speed limit, at which the drivetrain is controlled to simulate a drivetrain having a fixed-gear transmission and a bridged converter transmission in which the driving force is transmitted at a fixed-gear ratio to the fixed-gear transmission, such that the driving force in the drivetrain is transmittable via the continuously variable transmission only at different fixed gear ratios.

10. The method according to claim 9, comprising:

detecting a decreasing drive output rotation speed; and controlling the continuously variable transmission of the drivetrain to simulate the drivetrain having a fixed-gear transmission and a coupled converter transmission by reducing the continuously variable transmission ratio in response to detecting the decreasing drive output rotation speed.

11. The method according to claim 9, wherein simulating the bridged converter transmission and the coupled converter transmission by controlling the drivetrain as a function of an accelerator-pedal-dependent target drive output rotation speed.

12. The method according to claim 8, wherein the drive output rotation speed limit is specified as a function of a detected accelerator pedal position.

13. The method according to claim 8, wherein the drive output rotation speed limit is specified as a function of the drive output rotation speed.

* * * * *